(12) United States Patent
Gillespie et al.

(10) Patent No.: US 7,007,126 B2
(45) Date of Patent: Feb. 28, 2006

(54) ACCESSING A PRIMARY BUS MESSAGING UNIT FROM A SECONDARY BUS THROUGH A PCI BRIDGE

(75) Inventors: Byron R. Gillespie, Scottsdale, AZ (US); Barry R. Davis, Portland, OR (US); William Futral, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 09/023,494

(22) Filed: Feb. 13, 1998

(65) Prior Publication Data

US 2004/0139267 A1 Jul. 15, 2004

(51) Int. Cl.
*G06F 13/38* (2006.01)

(52) U.S. Cl. .................. 710/306; 370/402; 711/202
(58) Field of Classification Search .............. 710/300, 710/305–311, 126–129, 101, 1; 370/401, 370/402, 202; 709/208, 238; 711/202
See application file for complete search history.

(56) References Cited

U.S. PATENT DOCUMENTS

| 5,555,383 A | 9/1996 | Elazar et al. |
| 5,619,728 A | 4/1997 | Jones et al. |

(Continued)

OTHER PUBLICATIONS

"Using SCAN Bridge as an IEEE 1149.31 protocol addressable, multidrop, backplane test bus" by J. Andrews (abstract only) Publication Date: Oct. 2–6, 1994.*

"Design and implementation of a CAN/CAN bridge" by Ekiz et al. (abstract only) Publication Date: Jun. 12–14, 1996.*

"The GIGAswitch control processor" by Walsh, R.J; Ozveren, C.M. (abstract only).*

*Primary Examiner*—Gopal C. Ray
(74) *Attorney, Agent, or Firm*—Blakely, Sokoloff, Taylor & Zafman LLP

(57) ABSTRACT

An I/O subsystem having a processor, a bridge unit, and an I/O messaging unit that couple a primary, secondary and tertiary bus in a computer system. The bridge unit is configurable to claim requests that access a messaging unit (MU) address range from the secondary bus, the MU itself being coupled to the primary bus. The MU interrupts the processor when an I/O request is posted, in response to which the processor reads from the MU pointers to an I/O messages and may then execute the I/O message. To promote the portability of software written for agents on either the primary or the secondary bus that wish to access the MU, the primary and secondary address translation units of the I/O subsystem are programmed to claim the same address translation window, where the MU address range is a portion of the primary ATU address translation window, and the secondary ATU is configured to not claim requests within the MU address range. In a particular embodiment, the I/O subsystem may be implemented as a single integrated circuit chip (I/O processor) which is configured to support the intelligent I/O ($I_2O$®) protocol in connection with Peripheral Components Interconnect (PCI) primary and secondary system busses. By configuring the bridge to claim the MU address range on the secondary bus, the I/O subsystem may permit agents on the secondary bus to perform the $I_2O$ protocol without interrupting the host processor which normally resides on the primary PCI bus.

31 Claims, 3 Drawing Sheets

U.S. PATENT DOCUMENTS

| | | | | |
|---|---|---|---|---|
| 5,734,847 A | * | 3/1998 | Garbus et al. | 710/128 |
| 5,734,850 A | | 3/1998 | Kenny et al. | |
| 5,774,683 A | * | 6/1998 | Gulick | 710/315 |
| 5,832,245 A | * | 11/1998 | Gulick | 710/306 |
| 5,838,935 A | * | 11/1998 | Davis et al. | 710/129 |
| 5,848,249 A | * | 12/1998 | Garbus et al. | 710/128 |
| 5,857,080 A | * | 1/1999 | Jander et al. | 710/127 |
| 6,047,349 A | * | 4/2000 | Klein | 710/315 |
| 6,128,684 A | * | 10/2000 | Okayama | 710/109 |
| 6,173,383 B1 | * | 1/2001 | Casamatta | 711/202 |
| 6,374,321 B1 | * | 4/2002 | Pawlowski et al. | 710/260 |
| 6,587,868 B1 | * | 7/2003 | Porterfield | 709/203 |
| 6,735,659 B1 | * | 5/2004 | Nakanishi et al. | 710/305 |
| 6,745,369 B1 | * | 6/2004 | May et al. | 716/1 |

* cited by examiner

ACCESSING A PRIMARY BUS MESSAGING UNIT FROM A SECONDARY BUS THROUGH A PCI BRIDGE

BACKGROUND OF THE INVENTION

This invention is generally related to computer systems having an input/output (I/O) subsystem in a multiple bus architecture, and more specifically to accessing an I/O messaging unit from a secondary bus.

To help eliminate the performance bottleneck presented by the use of I/O devices or peripherals in multiple bus computer systems, system designers have turned to the concept of an intelligent I/O subsystem. Such a subsystem typically includes a subsystem processor and a local memory sharing a local bus that is separate from the host system busses. In such a computer system, interrupt-intensive I/O tasks such as transfers between peripheral devices are redirected from the host processor to the I/O subsystem in order to free resources on the system busses. Such an architecture also allows I/O performance to increase independently of the host processor so as to alleviate the I/O bottleneck. FIG. 1 illustrates an exemplary multiple bus computer system 100 featuring an intelligent I/O subsystem 110.

The computer system 100 of FIG. 1 is based on the industry-standard Peripheral Components Interconnect (PCI) specification generally defined by the PCI Special Interest Group in *PCI Local Bus Specification*, Revision 2.1, Oct. 21, 1994. The system features two physically separate PCI system busses, primary PCI bus 114 and secondary PCI bus 118. A bridge unit 126 combines the two system busses into one logical bus having a single PCI address space that is compliant with the *PCI-to-PCI Bridge Architecture Specification*, Revision 1.0, also published by the PCI Special Interest Group, Apr. 5, 1994. Agents such as host processor 164 and peripheral devices such as first PCI agent 172 and second PCI agent 176 reside on the system busses and communicate transparently with each other through the bridge. A third or local bus 122 is coupled to the system busses via the primary and secondary address translation units (P_ATU 134, S_ATU 146). The ATUs support transactions between the PCI address space and the I/O subsystem local address space. A subsystem processor 152 and memory controller unit (MCU) 156 coupled to a local memory communicate with each other using the local bus 122. The subsystem processor 152 and local memory bring intelligence to the I/O subsystem by processing the I/O message tasks at the I/O subsystem level versus the host processor 164 level.

The I/O subsystem also includes an I/O messaging unit (MU) 130 which is closely coupled to or, alternatively, a part of the P_ATU 134. At a lower level, the MU facilitates I/O transactions, i.e. the transfer of data between the PCI agents on the primary bus and the subsystem processor and local memory. On a higher level, the MU provides for data transfer between the host operating system and the I/O subsystem through the posting of requests and completions of I/O transactions. I/O transactions involve the transfer and performing of I/O messages that comply with the *Intelligent I/O ($I_2O$®) Architecture Specification*, Version 1.5, March 1997. The specification is designed to simplify the task of building and maintaining high performance I/O systems. The $I_2O$ specification provides a common I/O device driver and I/O (or $I_2O$) protocol that is independent to both the specific control device and the host operating system.

More particularly, the $I_2O$ specification supports message passing between agents and the I/O subsystem. These I/O messages typically specify operations to be performed by the subsystem processor 152 and MCU 156. Such messages are described in the $I_2O$ specification and are of a higher level format than conventional read and write transactions, and may include multiple PCI and/or local bus read and write transactions. For example, an I/O message may contain a sequence of transactions that request the I/O subsystem to read data from local memory and write the data to an agent on the primary PCI bus 114. Another example is an I/O message that provides an agent with the address information required for performing a transaction with another agent on the primary PCI bus 114. Such a message is typically used by a peripheral device to communicate with another device while bypassing the host processor 164.

In general, the host processor 164 is configured (through the host operating system and other software) to place the I/O messages in host memory 168, and initialize the MU 130 by providing pointers to the I/O messages. These pointers are stored in message queues and are accessed through the MU 130. The MU guarantees a fixed address range on the primary bus which may be used by the PCI system and the I/O subsystem to access the pointers and the I/O messages. The message queues may be stored in host memory 168, or in I/O memory 160 and may be accessed via the MU 130 in response to I/O requests received from agents on the primary bus 114 and from the subsystem processor 152.

The conventional mechanism for processing I/O requests by the MU involves only the P_ATU 134 and the primary PCI bus 114. Each ATU normally provides a two-way communication and data flow path between the local bus 122 and the corresponding PCI system bus. The ATU implements an address windowing scheme to determine which requests are to be claimed and translated to the appropriate bus. Transactions where a PCI bus master, such as PCI agent 164, is accessing the local bus 122 through the ATU are called inbound transactions. Each ATU may be programmed to define an inbound address translation window, where requests having PCI addresses within the window are claimed by the ATU and translated into a local bus address.

The MU 130 uses a portion of the primary inbound translation window of the P_ATU 134 to respond to I/O requests, as distinguished from other requests that seek transactions involving the local bus 122, from agents on the primary bus 114. The MU also uses the PCI configuration registers of the P_ATU for control and status information. In the conventional scheme, the I/O requests are typically initiated by the host processor 164 or other agent 172 on the primary PCI bus 114, and directed to the MU portion of the primary inbound translation window.

However, in the conventional scheme, an intelligent agent on the secondary PCI bus 118 does not have direct access to the MU 130 or the $I_2O$ protocol. Rather, the agent on the secondary bus requests the host processor (through the bridge 126) to perform the $I_2O$ protocol on its behalf. This increases the burden on the host processor, especially as the number of intelligent agents on the secondary bus 118 increase.

Therefore, a mechanism is desirable which allows the intelligent agent on the secondary bus to directly access the MU 130 in order to perform the $I_2O$ protocol while minimizing interaction with the host processor 164.

Preferably, such a mechanism should allow agent software that employs the $I_2O$ protocol to be portable, i.e., applicable without significant modifications, as to requests originating from both the primary and secondary busses. In addition, agents on both busses should be able to access the same amount of local memory in preferably the same address space when interfacing through the ATUs, so that the agents may be moved from one bus to another without the need for reconfiguring the software in each agent. In other words, the mechanism should not require knowledge by the agents of which bus they are located on before they are able to properly implement the I$_2$O protocol. Finally, the mechanism for accessing the messaging unit should sacrifice the least amount of PCI addresses given the constraint of fixed address space boundaries in the PCI bus specification.

One possible technique that may facilitate I$_2$O transactions from the secondary bus would be to add a second MU closely coupled to the S_ATU 146. The second MU would perform substantially the same as the messaging unit 130 in FIG. 1, except that the second MU would be configured to claim a portion of the S_ATU address space. This dual MU architecture, however, may present an additional problem when combined with the need for maintaining portability in agent software by requiring that the P_ATU and S_ATU address translation window (including the address range for the first and second MUs) to be the same. Having identical address translation windows for the P_ATU 134 and S_ATU 146 may require a scheme to manage several pairs of message queues in the MUs simultaneously, because there would exist a pair of pointers to the same I/O message, i.e., two pointers to the same location in host memory. This mechanism would require an additional data coherency protocol to support the dual MU mechanism. Such a coherency mechanism would require one MU to "snoop" or be aware and observe the actions of the other MU. When an I$_2$O transaction occurs, the silent MU would be required to invalidate some of its available message pointers to data, due to the activity of the other MU performing a valid transaction with the same data. Thus, a potentially complex data coherency issue arises when using such a dual MU design to achieve portability in PCI agent software.

Therefore, in view of the foregoing, there is a need for a mechanism that allows the I$_2$O protocol to be performed by agents on both the primary and secondary PCI busses, where the mechanism should also permit the development of MU accessing software.

SUMMARY

This invention in one embodiment is directed at a data processing device having a processor, a bridge unit, and a messaging unit (MU). The bridge unit is for coupling a primary bus to a secondary bus and, in particular, for forwarding requests from the secondary bus to the primary bus. The bridge is configurable to claim requests that access an MU address range from the secondary bus. The MU is configured to interrupt the processor in response to receiving a request to invoke a message, where the request accesses the MU address range and is initiated on the secondary bus. The processor is configured to access the message and then execute a number of instructions related to the message.

BRIEF DESCRIPTION OF THE DRAWINGS

These and other features as well as advantages of the different embodiments of the invention will be apparent by referring to the drawings, detailed description and claims below, where:

DETAILED DESCRIPTION

As briefly summarized above, the invention is directed to a data processing device which allows agents on a secondary bus of a multiple bus computer system to access a messaging unit (MU) which resides on the primary bus of the computer system. For purposes of explanation, specific embodiments are set forth below to provide a thorough understanding of the invention. However, as understood by one skilled in the art, from reading this disclosure, the invention may be practiced without such details. Furthermore, well-known elements, devices, process, steps, and the like, are not set forth in detail in order to avoid obscuring the invention.

A particular embodiment of the invention may be implemented using the PCI architecture and the I$_2$O specification. That particular embodiment allows the I$_2$O protocol to be performed between agents or devices on either the primary or secondary PCI bus and the I/O subsystem. In a further embodiment, access to the MU from either the primary or secondary bus is virtually identical in the sense that the same address range is used from either primary or secondary bus to access the MU.

Figure 1:
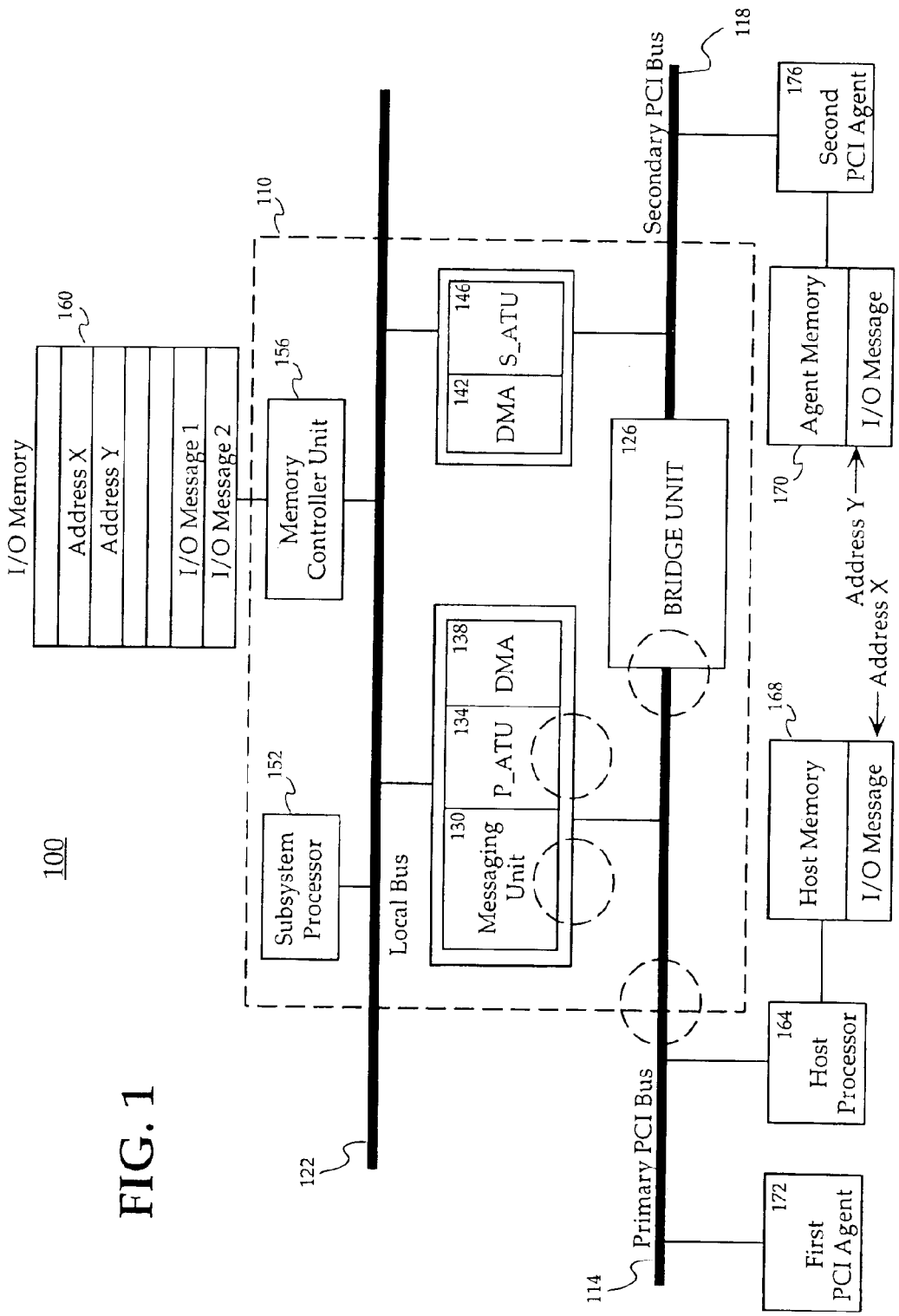
FIG. 1 illustrates a computer system suitable for implementing an embodiment of the invention.

In one embodiment of the invention, a data processing device includes some of the functional blocks of the I/O subsystem 110 shown in FIG. 1. In this embodiment, the data processing device may be a so-called I/O processor single integrated circuit having interfaces to a primary PCI bus 114 and secondary PCI bus 118, local bus 122, and local memory. A subsystem processor 152 is featured within the I/O subsystem 110 which couples to the local bus 122. The I/O subsystem 110 may also include a memory controller unit (MCU) 156 on the local bus 122. The MCU 156 handles all transactions on the local bus 122 that seek access to the I/O memory 160. Although the local bus 122 is shown to extend beyond the I/O subsystem 110 boundary in FIG. 1, the bus may alternatively lie entirely within the I/O subsystem 110 boundary, confined to the single IC as an internal bus of the I/O processor embodiment.

A bridge unit 126 is also included in the I/O subsystem 110 for coupling the primary to the secondary busses. The bridge unit 126 may be enabled to claim requests on the secondary bus for accessing the MU 130 address range, for example, in response to at least one enable bit in a register of the I/O subsystem 110 being toggled. Such an enable bit may be part of the configuration registers of the bridge unit 126 or the I/O subsystem 110.

Communication between the PCI system busses and the local bus 122 is accomplished through the primary and secondary address translation units (ATUs). Each ATU is configured to convert addresses of requests from the PCI system bus to the local bus 122, and vice versa. Each ATU has an address translation window which defines the range of requests that are claimed by the ATU.

Figure 2:
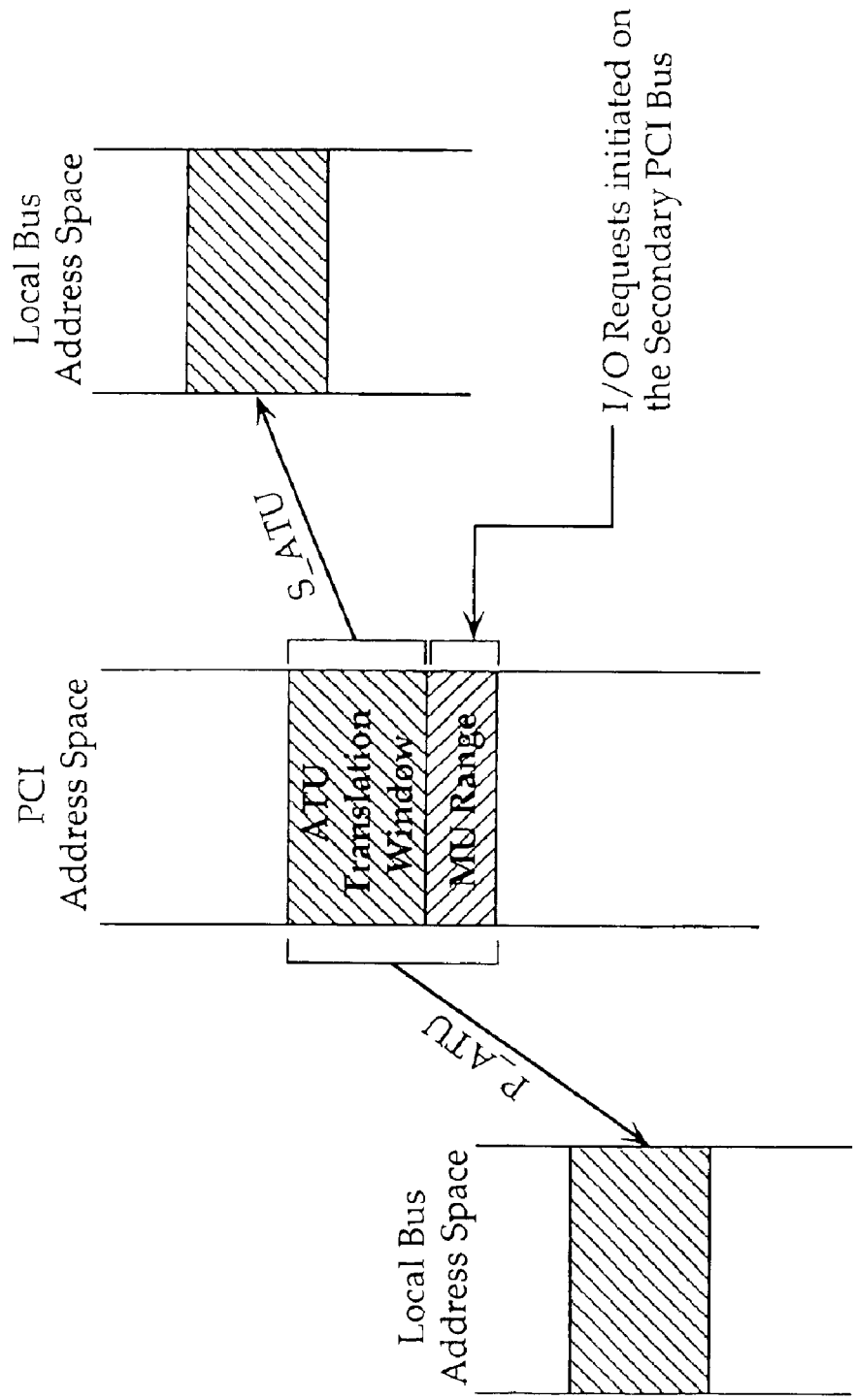
FIG. 2 illustrates the address spaces used for defining an embodiment of the invention.

The PCI address space of the computer system 100 in FIG. 1 includes a common ATU translation window that is used by the agents on the primary and secondary busses to initiate transactions with the I/O subsystem and the local bus. FIG. 2 illustrates the translation between the local and PCI address spaces performed by the P_ATU 134 and S_ATU 146, as well as the preferred range of the address translation windows and the location of the MU address range. Having the P_ATU 134 and S_ATU 146 share a common translation window, except for the MU range, will allow device driver software used for accessing the I/O subsystem to be portable between devices on either the primary or the secondary busses. FIG. 2 also shows the preferred MU range as being a part of the P_ATU translation window. The portion of the inbound translation window of the P_ATU 134 and S_ATU 146 that is not the MU range may be used for PCI transactions that access the I/O memory.

The I/O subsystem is configured such that whenever the bridge is enabled to claim the MU range on the secondary bus, the MU range ceases to be part of the S_ATU translation window. This may be controlled by an enable bit of the I/O subsystem 110. The bit may be part of the configuration registers of the bridge 126. When so enabled, transactions initiated on the secondary bus accessing the S_ATU translation window will still be forwarded to the local bus through the S_ATU 146, but I/O requests within the MU address range are not claimed by the S_ATU 146. Instead, the bridge unit claims those I/O requests on the secondary bus, and forwards them to the primary bus where they are claimed by the MU and/or P_ATU 134. The MU 130 will also respond to requests that are generated on the primary bus, for example by the host processor 164, provided the requests also access the MU address range.

Some of the mechanisms in the MU for message processing include message registers and circular queues. The message registers are used by the I/O subsystem to send and receive messages. When written, these registers may cause an interrupt to be generated to either the subsystem processor or the primary or secondary PCI busses.

The MU also has a number of circular queues, at least one for inbound messages and at least one for outbound messages. Inbound messages are those that are "posted" by an agent from either the primary or secondary bus, whereas outbound messages are those posted by the subsystem processor, to be processed by other processors or agents on the PCI busses. In the embodiment of the invention that complies with the I$_2$O specification, the circular queues contain pointers to locations in I/O memory which in turn contain pointers to where the actual I/O message may be found. An exemplary relationship between the pointers may be seen in FIG. 1.

In a particular embodiment, the I/O subsystem includes logic circuitry that allows a primary interface of the I/O subsystem that is logically distributed as shown in FIG. 1 to act as a master and a slave during the same transaction. The primary interface is shown as dotted circles coupled to the primary bus and in this embodiment serves the I/O subsystem as a whole, including the individual MU, P_ATU, and bridge units. When the primary interface is performing bridge-like functions, such as forwarding a request from the secondary bus to the primary bus, then the primary interface is configured to be a master on the primary bus when performing a request on behalf of an initiator. If the request contains an I/O message destined to the MU, then the primary interface will then be configured as a slave to receive the request. Thus, the primary interface behaves as both a master and a slave in the same transaction, where the transaction includes a request to perform an I/O message.

Some system applications of the I/O subsystem embodiment described above include peer-to-peer technology (allowing peripheral devices or "cards" on a PCI bus to communicate with each other), on-line storage backup and remote storage backup systems, file servers, database servers, World Wide Web (Web) servers, intranet servers, and on-line transaction processing systems. FIG. 1 may be used to illustrate an embodiment of the invention as a network server motherboard. In this embodiment, the I/O subsystem operates the same as described earlier, where in particular the I/O subsystem contains special decode circuitry that allows the S_ATU 146 to not claim the MU address range, and instead allowing the bridge unit 126 to claim requests on the secondary bus that access the MU address range. The requests on the secondary PCI bus 118 will in this case be generated by a network interface controller depicted as the second PCI agent 176 and may invoke an I/O message that attempts to transfer a block of received data to the host memory. The I/O message would be stored, for example, in the agent memory 170.

In another application, the second PCI agent 176 on the secondary bus may be a mass storage controller such as a disk controller. When configured as an intelligent agent, the disk controller has access to the I$_2$O protocol and can cause data to be transferred between the host memory and itself, without the need for intervention by the host processor, using the MU address range claimed by the bridge.

Figure 3:
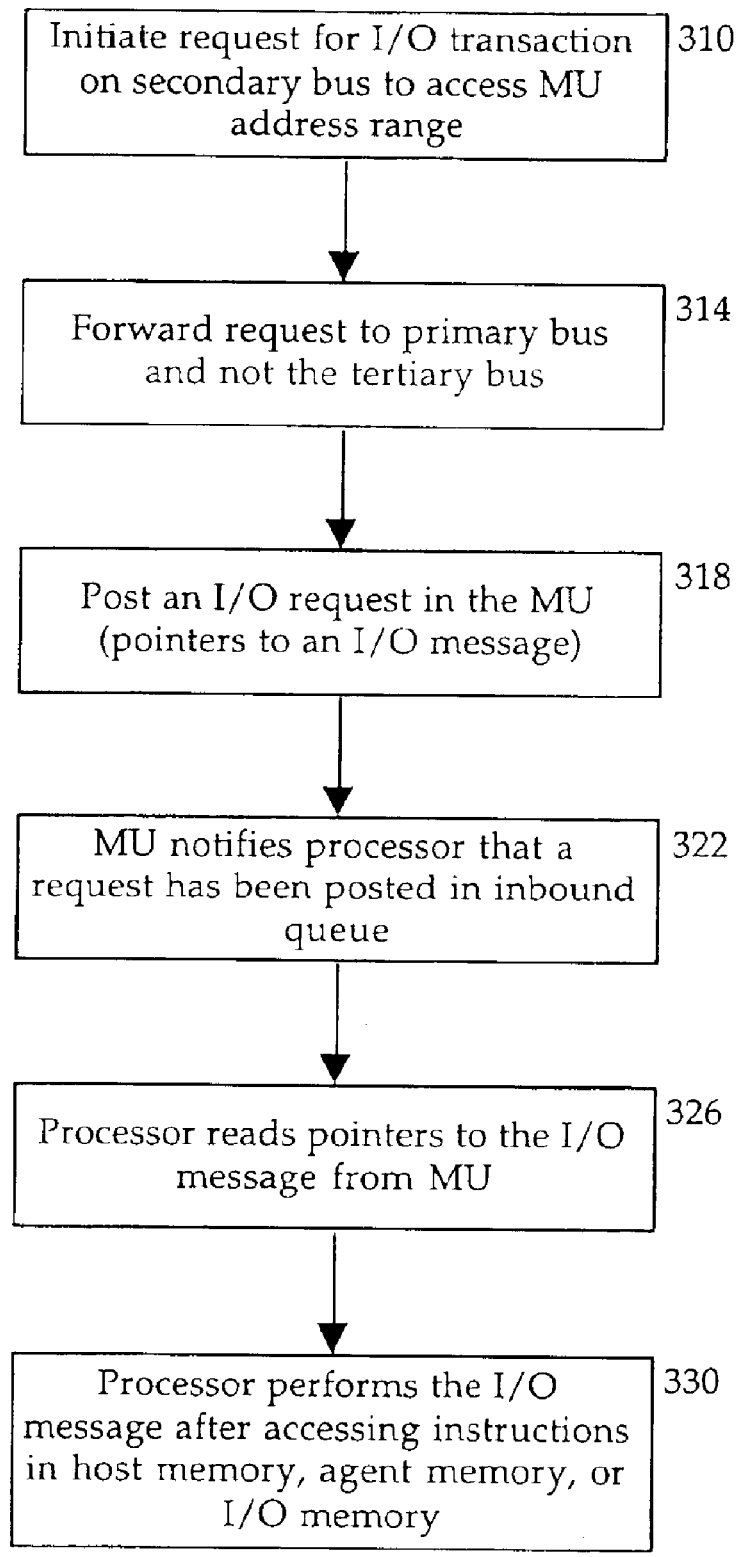
FIG. 3 is a flow diagram of the steps to be performed in a computer system according to another embodiment of the invention.

Having treated the apparatus and system embodiments of the invention, an embodiment of the invention as a series of steps performed by various elements in a computer system such as the one in FIG. 1 is illustrated as a data flow diagram in FIG. 3. Operation begins with an agent on the secondary bus determining a need to have an I/O message to be performed by the computer system.

After making such a determination, the agent initiates a request according to the I$_2$O protocol on the secondary bus to access the MU address range and post a first I/O message in the MU. As indicated earlier, the agent has the intelligence to select an I/O message from a number of messages that exist in the I$_2$O protocol. These messages have been configured into the computer system, either in host memory or agent memory, during a prior initialization scheme.

After the bridge receives notification of the request on the secondary bus, the bridge determines if the request falls within the MU address window. This window may also be preconfigured by the host processor during the initialization scheme. After claiming the request, the bridge may forward the request to the secondary bus. The request includes the information needed to identify the address of the I/O message, in either host memory 168, or agent memory 170. The S_ATU 146, which normally translates all PCI requests within its translation window on the secondary bus into requests on the local bus 122, is configured not to claim requests that are within the MU address range. Thus, the request is not forwarded from the secondary bus directly to the local bus 122.

After the bridge performs the request on the primary bus, the MU may claim the request and the I/O message is posted in the MU. The I/O message is posted by writing the address of the I/O message (pointer to the I/O message) to a circular queue having an address in the MU range. Where the MU address range is part of the P_ATU translation window, the request may initially be claimed by the P_ATU and then handed off to the MU.

Once the message has been posted, the MU notifies the subsystem processor of the posting. The subsystem processor may then read the pointer from the MU, and then accesses the I/O message, which at the time may be stored in the agent memory. Alternatively, the I/O subsystem (through the MU) may transfer the I/O message from agent memory 170 to I/O memory 160, via the direct memory access (DMA) units 138 or 142. In either case, the subsystem processor ultimately performs the I/O message by accessing instructions and data that are part of the I/O message. The memory controller may also be called upon by the subsystem processor to help perform some of the instructions in the message, such as transfer data to and from the I/O memory.

To summarize, the embodiments of the invention described above allow agents such as intelligent PCI agents on a secondary PCI bus 114 to access an MU 130 which resides on the primary bus of a multiple bus computer system having an I/O subsystem. This mechanism allows the industry standard I$_2$O® protocol to be performed between devices on either the primary or secondary bus and the I/O subsystem. Access to the MU from either primary or secondary bus becomes similar as far as the initial I/O request is concerned, permitting portable MU accessing software to be written. The I/O subsystem is configured with special decode circuitry that allows the S_ATU to not claim an MU address range, and instead allow the bridge to claim the address range. The bridge thus forwards all such requests to the primary bus, where the MU may claim the request, and notify the subsystem processor that an I/O message has been posted. In a further embodiment of the invention, the P_ATU 134 and S_ATU 146 are programmed to cover the same address translation window. In this way, agents on either the primary or secondary busses may access the MU 130 and the I/O memory 160 using the same initial request, thereby allowing agents to be moved from one bus to the other without having to reconfigure the MU accessing software in each one.

The embodiments of the invention described above are, of course, subject to some variations in structure and implementation. For example, the I/O messages may be stored in either the host memory 168 or the agent memory 170, and then be transferred to I/O memory 160 before being performed by the subsystem processor. Also the actual MU address range may be selected and programmed according to system application requirements. For example, a network server implementation of the invention may employ a large number of I/O messages and a large part of the I$_2$O protocol, and therefore require a greater number of addresses in the MU address range than would a workstation. Therefore, the scope of the invention should be determined not by the embodiments illustrated but by the appended claims and their legal equivalents.

What is claimed is:

1. A data processing device, comprising:
    bridge unit to couple a primary bus to a secondary bus and to claim a messaging unit (MU) address range on the secondary bus;
    processor; and
    messaging unit (MU) to be coupled to the primary bus, the MU to interrupt the processor in response to receiving a first request to invoke a first message, the first request accessing the MU address range and being initiated on the secondary bus, the processor to access the first message and execute a first plurality of instructions related to the first message.

2. The data processing device of claim 1 further comprising:
    a secondary address translation unit (S_ATU) to couple the secondary bus to a tertiary bus to convert addresses of requests on the secondary bus to tertiary addresses, the S_ATU to not claim the MU address range on the secondary bus.

3. A data processing device as in claim 2 wherein the bridge unit can be enabled to claim said MU address range in response to at least one enable bit of said data processing device being toggled.

4. A data processing device as in claim 3 wherein the S_ATU is to not claim the MU address range on the secondary bus in response to the enable bit being toggled.

5. A data processing device as in claim 1 wherein said MU is to interrupt the processor in response to receiving a second request that accesses the MU address range, the second request being initiated on the primary bus.

6. A data processing device as in claim 1 wherein the MU further comprises a queue for storing a pointer to the first message, the processor to read the pointer and in response access the first message.

7. A data processing device as in claim 1 further comprising:
    primary interface to be (1) a master on the primary bus when forwarding a request as the bridge unit, and (2) a slave when responding to the request as the messaging unit.

8. A data processing device as in claim 1 further comprising:
    a memory controller to be coupled to a tertiary bus, the processor to be coupled to the tertiary bus and to access the first message via the memory controller.

9. A data processing device as in claim 8 wherein said first plurality of instructions are stored in a memory coupled to the memory controller.

10. A data processing device as in claim 2 further comprising:
    primary address translation unit (P_ATU) to couple the primary bus to the tertiary bus, to convert addresses of requests on the primary bus to tertiary addresses, said P_ATU to claim requests having addresses within a primary address translation window, and wherein
    said S_ATU is to claim requests having addresses within a secondary address translation window, and wherein
    the MU address range is a part of the primary address translation window.

11. A data processing device as in claim 10 wherein the first and second address translation windows cover the same address range.

12. A computer system comprising:
    primary bus;
    secondary bus;
    I/O subsystem coupling the primary and secondary busses, the I/O subsystem having
        a subsystem processor,
        bridge unit coupling the primary bus to the secondary bus to claim requests that access a messaging unit (MU) address range from the secondary bus, said bridge unit to forward requests from the secondary bus to the primary bus,
    messaging unit (MU) coupled to the primary bus,
    the MU to interrupt the subsystem processor in response to receiving a first request to invoke a first message, the first request accessing the MU address range and being initiated on the secondary bus, the subsystem processor to access the first message and execute a first plurality of instructions related to the first message.

13. A computer system as in claim 12 further comprising:
    tertiary bus; and
    secondary address translation unit (S_ATU) coupling the secondary bus to the tertiary bus, to convert addresses of requests on the secondary bus to tertiary addresses, said S_ATU to claim requests within a secondary address translation window, and to not claim the MU address range.

14. A computer system as in claim 13 wherein the bridge unit is enabled to claim said MU address range and wherein the S_ATU is to not claim the MU address range, both in response to at least one enable bit of said computer system being toggled.

15. A computer system as in claim 13 further comprising:
primary interface to be a master when forwarding a request as the bridge unit and a slave when responding to the request as the messaging unit.

16. A computer system as in claim 13 wherein the I/O subsystem further comprises a memory controller coupled to the tertiary bus, the processor to access the first message via the memory controller.

17. A computer system as in claim 16 further comprising an I/O memory coupled to the memory controller, said first plurality of instructions being stored in said I/O memory.

18. A computer system as in claim 13 further comprising
primary address translation unit (P_ATU) coupling the primary bus to the tertiary bus, to convert addresses of requests on the primary bus to tertiary addresses, said P_ATU to claim requests having addresses within a primary address translation window, and wherein
said S_ATU is to claim requests having addresses with a secondary address translation window, and wherein
the MU address range is a part of the primary address translation window.

19. A computer system as in claim 18 wherein the first and second address translation windows cover the same address range.

20. A computer system as in claim 12 wherein
said MU is to interrupt the processor in response to receiving a second request that accesses the MU address range, the second request being initiated on the primary bus.

21. A computer system as in claim 12 wherein the MU further comprises a queue to store a pointer to the first message, the processor to read the pointer and in response access the first message.

22. In a computer system having a system bus that includes a primary PCI bus and a secondary PCI bus, an agent residing on said secondary bus, a tertiary bus, and an I/O subsystem, the I/O subsystem having a bridge for forwarding requests between the primary bus and the secondary bus, messaging unit (MU) for posting I/O requests and completions, the I/O subsystem to claim an MU address range on the primary bus, subsystem processor coupled to the tertiary bus, and I/O memory coupled to the tertiary bus, a method comprising:
initiating a I/O request on the secondary bus to access the MU address range;
forwarding the request to the primary bus and not to the tertiary bus;
posting the request in the MU;
notifying the processor that the request has been posted in the MU; and
performing an I/O message related to the request.

23. A method as in claim 22 further comprising
a primary address translation unit (P_ATU) in the I/O subsystem claiming the request on the primary bus before posting the I/O request.

24. A method as in claim 22 wherein posting the I/O request comprises receiving pointers in the MU to the I/O message.

25. A method as in claim 22 where performing the I/O message comprises the subsystem processor executing a plurality of instructions stored in the I/O memory.

26. A method as in claim 22 further comprising, before forwarding the request, enabling the bridge by a host processor on the primary bus modifying one or more bits in a register of the I/O subsystem, the bridge being enabled to claim the MU address range on the secondary bus.

27. In a computer system having a first bus and a second bus, an agent residing on said second bus, a third bus, and an I/O subsystem, the I/O subsystem having a bridge for forwarding requests between the first bus and the second bus, messaging unit (MU) for posting I/O requests and completions, the I/O subsystem to claim an MU address range on the first bus, subsystem processor coupled to the third bus, and I/O memory coupled to the third bus, a method comprising:
initiating a I/O request on the second bus to access the MU address range;
forwarding the request the first bus and not to the third bus;
posting the request in the MU;
notifying the processor that the request has been posted in the MU; and
performing an I/O message related to the request.

28. A method as in claim 27 further comprising:
a first address translation unit in the I/O subsystem claiming the request on the first bus before posting the I/O request.

29. A method as in claim 27 wherein posting the I/O request comprises receiving pointers in the MU to the I/O message.

30. A method as in claim 27 wherein performing the I/O message comprises the subsystem processor executing a plurality of instructions stored in the I/O memory.

31. A method as in claim 27 further comprising, before forwarding the request, enabling the bridge by a host processor on the first bus modifying one or more bits in a register of the I/O subsystem, the bridge being enabled to claim the MU address range on the second bus.

* * * * *